Patented Dec. 2, 1930

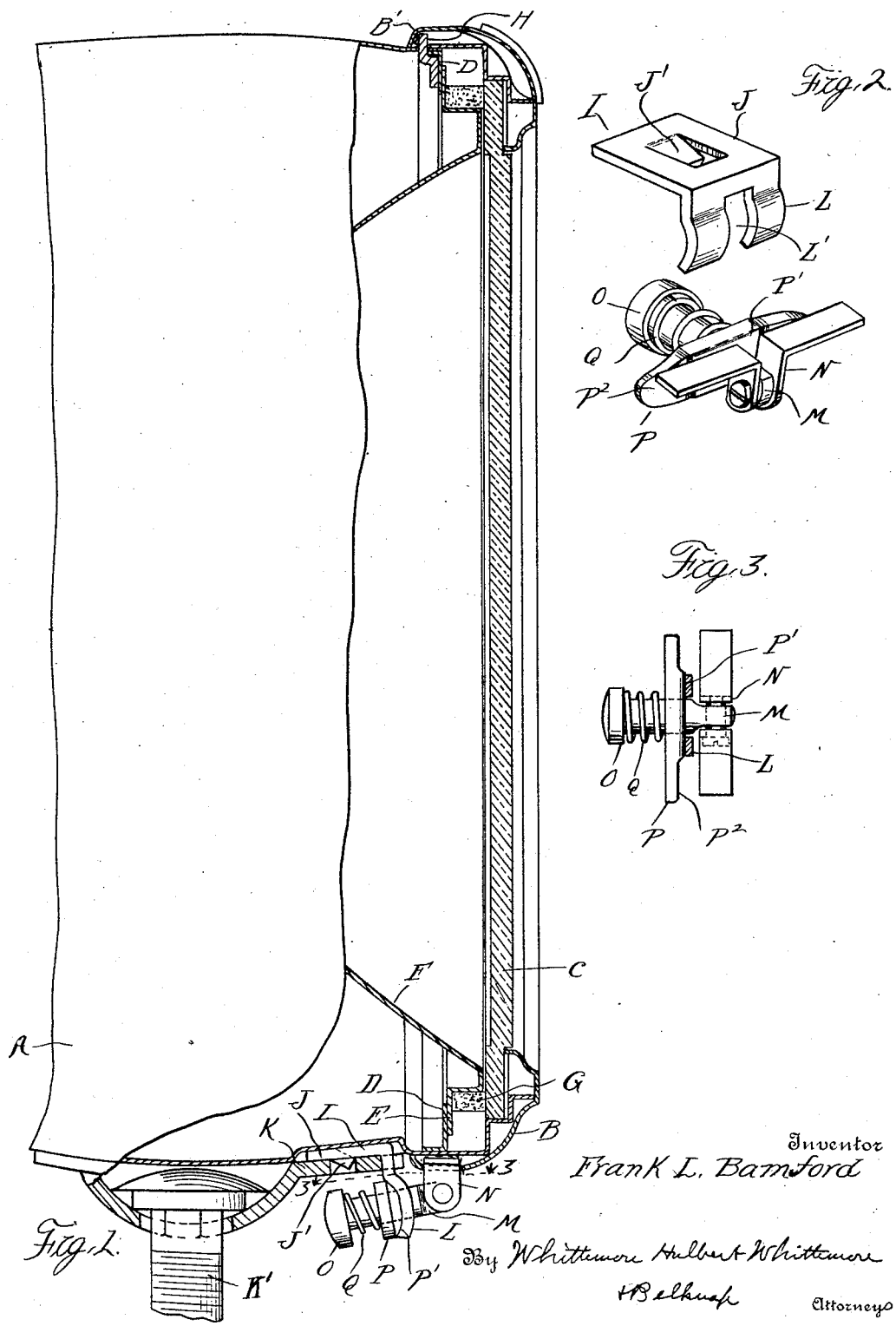

1,783,598

UNITED STATES PATENT OFFICE

FRANK L. BAMFORD, OF DETROIT, MICHIGAN, ASSIGNOR TO C. M. HALL LAMP COMPANY, OF DETROIT, MICHIGAN, A CORPORATION OF MICHIGAN

LAMP CATCH

Application filed September 30, 1925. Serial No. 59,658.

The invention relates to vehicle lamps and consists in the peculiar construction of catch through which the lens holding ring is resiliently held to its seat.

In the drawings:

Figure 1 is a central longitudinal section through a lamp casing showing my improved catch applied thereto.

Figure 2 is a perspective view of the catch;

Figure 3 is a plan view taken on the line 3—3 of Figure 1.

A is the casing or housing for the lamp. B is the lens holding ring which telescopically engages the forward end of said casing and which is provided with the lens C. D is a flange extending radially inward from the forward end of the housing A and E is a reflector having a radially outwardly extending flange F seated upon the flange D. This flange is formed with an annular outwardly extending bead around which is arranged a gasket member G forming a seat for sealing contact with the lens.

Preferably the ring B is held upon the casing A by a lug H that extends upwardly from the flange D through the casing A in advance of an inturned marginal flange B' of the ring B. There is also arranged upon the diametrically opposite side of the housing a catch member of the following construction;

I is a member preferably formed of pressed sheet metal having a flange J fitting within a recess in the wall of the casing and covered by the reinforcing bracket member K in which the lamp supporting post K' is anchored. The flange J has the struck out lug J' for engaging an aperture in the reinforcing member K. This lug forms a thrust bearing through which any forward stress on the member J is carried into said reinforcing member K. L is an outwardly extending flange of the member I which is slightly curved to form a concave seat in its rear face and which is centrally slotted at L'. M is the shank member pivotally attached by means of ears N to the ring member B and having at its free end an annularly recessed flange or head O. P is a cross bar preferably formed of pressed sheet metal with a central convex portion P' for engaging the concave member L and outward extensions P² on opposite sides thereof. The member P is centrally apertured to be sleeved upon the shank M and a spring Q also sleeved on said shank and bearing against the grooved head O exerts a resilient pressure upon the cross bar. The construction is such that by pressing the cross bar rearwardly against the tension of the spring Q it may be snapped into engagement with the concave bearing L which will retain it in this position while the tension of the spring Q operating through the shank M and ears N will draw the ring member against the gasket G. To disengage the catch for detachment from the ring member it is only necessary for the operator to press his fingers against the portion P' of the cross bar forcing it inward against the tension of the spring Q and this disengages the same from the concave bearing L.

What I claim as my invention is:

1. In a lamp fastener, a catch for holding a lens holding ring in engagement with a lamp casing comprising a shank pivotally attached to the ring, a cross bar sleeved on said shank, a spring also sleeved on said shank having its rear end engaging a shoulder thereon and its forward end bearing against said cross bar, the said shank projecting on opposite sides of the cross bar to provide a free end for facilitating the pressing of the cross bar against the spring, and a flange projecting outward from said casing forming a bearing for engagement of said cross bar slotted to permit the passage of said shank, the said catch being releasable without increase of the force acting to hold said ring in engagement with said casing.

2. In a lamp fastener, a catch for holding a lens holding ring in engagement with a lamp casing comprising a shank member pivotally connected to the ring, a cross bar sleeved upon said shank member, a spring on said shank member forming a resilient bearing for said cross bar, and a member projecting from said casing having an inner flanged portion with a struck out lug, said flanged portion being located in a recess in the wall of said casing, a reinforcing bracket for said casing covering said flange and aperture to form a shoulder for engagement with said struck out lug, and an outwardly extending flange on said member projecting from said casing forming a seat for engagement of said cross bar and slotted for the passage of said shank.

3. In a lamp fastener, a casing, a lens holding ring engageable therewith, and a catch for said ring comprising a substantially angle shaped member having an inner flanged portion with a struck out lug located in a recess in said casing, and an outwardly extending portion with a concave bearing and centrally slotted, a reinforcing bracket member secured to said casing and covering said inner flange, said bracket member being apertured to form a shoulder for engagement of said struck out lug and through which forward stresses are transmitted into said reinforcing member, a shank member pivotally attached to said ring member having a grooved flange at its free end, a spring sleeved on said shank member engaging said grooved flange and a cross bar also sleeved on said shank member having a central convex portion for engaging said outwardly extending member on said casing and having projections beyond said central portion forming operating portions for pressing said cross bar against the tension of said spring to engage or disengage the same from the said outwardly projecting member.

4. In a lamp fastener, a casing, a lens holding ring engageable therewith, and a catch for holding said lens ring comprising a shank pivotally attached to the ring and having a head or shoulder at its free end, a spring sleeved on said shank, a cross bar also sleeved on said shank and engaging said spring, and a slotted bearing on said casing with which said cross bar may be engaged, the projecting ends of said cross bar forming finger pieces adapted with the head of the shank to form opposed gripping members for disengaging the cross bar from said bearing by compressing said spring.

5. In a lamp fastener, a lamp casing, a lens holding ring engageable therewith, a reinforcing bracket secured to the casing, an angle member having a portion fitting between the said bracket and the casing and a second portion projecting radially from the casing, a lug on the first mentioned portion of the angle member engaging the bracket, and means carried by the said lens holding ring for resiliently engaging the radially projecting portion of the said angle member.

6. In a lamp fastener, a catch for holding a lens holding ring in engagement with a lamp casing, said catch including in combination a member projecting from said casing, a shank pivotally attached to said ring, a cross bar slidably mounted on said shank, and means for yieldably urging said cross bar into engagement with said member for securing said lens ring in position, said shank having an exposed free end whereby the said cross bar may be drawn toward the free end of the said shank to release its engagement with the said member without increasing the force acting to hold the said lens ring in engagement with the said casing.

In testimony whereof I affix my signature.

FRANK L. BAMFORD.